(12) United States Patent
Pusarla et al.

(10) Patent No.: US 12,500,707 B2
(45) Date of Patent: Dec. 16, 2025

(54) NETWORK SIDE RECEIVER FOR RECEIVING HIGH VELOCITY TRANSMITTED SIGNALS

(71) Applicant: Rakuten Symphony, Inc., Tokyo (JP)

(72) Inventors: Kiran Kumar Pusarla, Bangalore (IN); Venkatesh Muralidhara, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 311 days.

(21) Appl. No.: 18/020,756

(22) PCT Filed: Oct. 25, 2022

(86) PCT No.: PCT/US2022/047692
§ 371 (c)(1),
(2) Date: Feb. 10, 2023

(87) PCT Pub. No.: WO2024/091225
PCT Pub. Date: May 2, 2024

(65) Prior Publication Data
US 2024/0204928 A1    Jun. 20, 2024

(51) Int. Cl.
*H04L 5/00*  (2006.01)
*H04L 27/26*  (2006.01)
*H04W 72/21*  (2023.01)

(52) U.S. Cl.
CPC ......... *H04L 5/0007* (2013.01); *H04L 5/0053* (2013.01); *H04L 27/2649* (2013.01); *H04W 72/21* (2023.01)

(58) Field of Classification Search
CPC . H04L 5/0007; H04L 5/0053; H04L 27/2649; H04L 25/0224; H04L 27/261;
(Continued)

(56) References Cited

U.S. PATENT DOCUMENTS 11,310,021 B2 *  4/2022  Levitsky .............. H04B 17/336
2008/0056305 A1 *  3/2008  Medvedev .......... H04L 27/2657
                                                            370/491
(Continued)

FOREIGN PATENT DOCUMENTS

JP    2009-538579 A    11/2009
JP    2012-151763 A     8/2012
WO    2007/137281 A2   11/2007

OTHER PUBLICATIONS

International Search Report and Written Opinion of the International Searching Authority issued by the United States Patent and Trademark Office for corresponding International Patent Application No. PCT/US22/47692, electronically delivered on Mar. 14, 2023.

(Continued)

*Primary Examiner* — Dady Chery
(74) *Attorney, Agent, or Firm* — Myers Wolin, LLC (57) ABSTRACT

Techniques are provided for receiving PUSCH and PUCCH transmitted by a high speed transmitter. The techniques include calculating a phase difference of OFDM symbols of the PUCCH from OFDM symbols of a first DM-RS and OFDM symbols of a second DM-RS of the PUCCH, correlating the OFDM symbols of the first DM-RS and second DM-RS. Determine a doppler shift and report it to L2. Compensate channel estimates and data symbols with the doppler shift. Equalize and demodulate the PUCCH. Perform a first level of phase correction on the PUSCH by correcting the phase on output samples of an IDFT from the doppler shift received from L2. Measure a phase deviation on the output of the first level of phase correction, accumulate the measured phase deviation and the doppler shift (Continued)

received from L2, to derive an accumulated phase correction, and report the accumulated phase correction to L2. Demodulate the PUSCH.

20 Claims, 8 Drawing Sheets

(58) Field of Classification Search
CPC .............. H04L 5/0051; H04L 27/2695; H04L 27/2675; H04W 72/21
See application file for complete search history.

(56) References Cited

U.S. PATENT DOCUMENTS

| | | | |
|---|---|---|---|
| 2013/0003880 A1 | 1/2013 | Lu et al. | |
| 2015/0230193 A1* | 8/2015 | Lu ..................... | H04W 56/0035 370/328 |
| 2016/0337105 A1* | 11/2016 | Lawton ................ | H04L 1/0028 |
| 2017/0111147 A1* | 4/2017 | Cao .................... | H04L 27/2613 |
| 2017/0289733 A1* | 10/2017 | Rajagopal ............ | H04L 5/0082 |
| 2018/0316409 A1* | 11/2018 | Yoon .................... | H04L 5/0044 |
| 2020/0351124 A1* | 11/2020 | Babaheidarian ......... | H04L 5/16 |
| 2023/0208493 A1* | 6/2023 | Abebe ................. | H04B 7/0628 370/329 |

OTHER PUBLICATIONS

Notice of Reasons for Refusal issued by the Japan Patent Office for Japanese Patent Application No. 2024-558270, mailed on Sep. 16, 2025, with English translation.
Moderator (NTT Docomo, Inc.), "Summary #1 on 9.11.1 Coverage enhancement for NR NTN"; Agenda item: 9.11.1, 3GPP TSG RAN WG1 #110bis-e; R1-2210344, e-Meeting, Oct. 10-19, 2022.

* cited by examiner

NETWORK SIDE RECEIVER FOR RECEIVING HIGH VELOCITY TRANSMITTED SIGNALS

CROSS-REFERENCE TO RELATED APPLICATION

This application is a national stage application of International Application No. PCT/US2022/047692, filed on Oct. 25, 2022, and designated the U.S., the entire contents of which are herein wholly incorporated by reference.

TECHNICAL FIELD

In some example embodiments, the subject matter herein generally relates to mobile wireless communication systems and a more specifically to network side receiver receiving wireless signals transmitted from a mobile type of device traveling at a high velocity.

BACKGROUND

The introduction and proliferation of digital wireless networks in the 1990s was the beginning of a wireless revolution. Commercial wireless providers transitioned from analog to digital wireless technology enabling more efficient use of wireless resources leading to an increase in wireless voice traffic and a dramatic increase in wireless digital data services. What followed was a paradigm shift from wired to wireless. Wireless computer networks, wireless Internet and the like are now expected to be available nearly everywhere.

Wireless users may include traditional mobile phone users and portable computing devices such as a laptop computer or tablet. The difference between modern mobile phones and personal computing devices has become difficult to distinguish. Modern mobile phones have morphed into personal computing devices hosting applications or services for talk, text, messaging, email, video recording and viewing, and live streaming as well as applications typically found on a personal or business computing devices, for example word processing, spread sheets and the like.

Wireless access is available in virtually every metropolitan area. In addition, it has become common for wireless users to access their devices while traveling by car, bus, trains and the like.

In order to establish and maintain a wireless connection between a wireless device and wireless network receiver such as a base station or eNB, the base station or eNB must be able to decode the Physical Uplink Shared Channel (PUSCH) and Physical Uplink Control Channel (PUCCH).

Some land based modes of transportation provide travel at a high velocity or rate of speed, for example a bullet train that may travel at speeds in excess of 350 kph or 217 mph.

Conventional wireless network receivers (e.g. an eNB) may not be able to decode the PUSCH and PUCCH due to the high phase deviation caused by the doppler shift in signals transmitted in a high speed environment. While WiFi service may be available in some modes of transportation, access is limited.

Thus, the need exists for a solution to enable a network receiver such as base station or eNB to receive signals transmitted while traveling at a high velocity or rate of speed.

SUMMARY

In one general aspect, a method of decoding a Physical Uplink Shared Channel (PUSCH) and a Physical Uplink Control Channel (PUCCH) transmitted in a high-speed environment and received by a receiver is disclosed. The method may include calculating a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received at the receiver. The method may include correlating the OFDM symbols of the first DM-RS and the second DM-RS, and determining a doppler shift where the doppler shift is proportional to the phase difference across the DM-RS symbols in the channel. The method may include reporting the doppler shift to Layer 2 (L2) of a protocol stack. The method may include compensating channel estimates and data symbols with the doppler shift, and equalizing and demodulating the PUCCH. The method may include performing a first level of phase correction on the PUSCH received by the receiver by correcting the phase on output samples of an Inverse Discrete Fourier transform (IDFT) from the doppler shift received from Layer 2, measuring a phase deviation on the output of the first level of phase correction, and accumulating the measured phase deviation on the output of the first level of phase correction and the doppler shift received from Layer 2, to derive an accumulated phase correction, and reporting the accumulated phase correction to Layer 2. The method may include performing a second level of phase correction according to the measured phase deviation of the output of the first level of phase correction, and demodulating the PUSCH. Other embodiments of this aspect include corresponding computer systems, apparatus, and computer programs recorded on one or more computer storage devices, each configured to perform the actions of the methods.

In another general aspect, an apparatus for decoding a Physical Uplink Shared Channel (PUSCH) and a Physical Uplink Control Channel (PUCCH) transmitted in a high-speed environment and received by a receiver is disclosed. The apparatus may include a memory configured to store a plurality of instructions, and processor circuitry coupled to the memory and configured to execute the plurality of instructions to: calculate a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received by the receiver, correlate the OFDM symbols of the first DM-RS and the second DM-RS, determine a doppler shift where the doppler shift is proportional to the phase difference across the DM-RS symbols in the channel, report the doppler shift to Layer 2 of a protocol stack, compensate channel estimates and data symbols with the doppler shift, equalize and demodulate the PUCCH, perform a first level of phase correction on the PUSCH received by the receiver by correcting the phase on output samples of an Inverse Discrete Fourier transform (IDFT) from the doppler shift received from Layer 2, measure a phase deviation on the output of the first level of phase correction, accumulate the measured phase deviation on the output of the first level of phase correction and the doppler shift received from Layer 2, to derive an accumulated phase correction, report the accumulated phase correction to Layer 2, perform a second level of phase correction according to the measured phase deviation of the output of the first level of phase correction, and demodulate the PUSCH.

In yet another general aspect, a communication system comprising a mobile device configured to transmit a Physical Uplink Shared Channel (PUSCH) and a Physical Uplink Control Channel (PUCCH) in a high-speed environment and an eNB configured to receive the PUSCH and PUCCH is disclosed. The eNB is configured to: calculate a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received by from the mobile device; correlate the OFDM symbols of the first DM-RS and the second DM-RS, determine a doppler shift where the doppler shift is proportional to the phase difference across the DM-RS symbols in the channel, report the doppler shift to Layer 2 of a protocol stack; compensate channel estimates and data symbols with the doppler shift, equalize and demodulating the PUCCH, perform a first level of phase correction on the PUSCH received by the receiver by correcting the phase on output samples of an Inverse Discrete Fourier transform (IDFT) from the doppler shift received from Layer 2, measure a phase deviation on the output of the first level of phase correction; accumulate the measured phase deviation on the output of the first level of phase correction and the doppler shift received from Layer 2, to derive an accumulated phase correction; report the accumulated phase correction to Layer 2, perform a second level of phase correction according to the measured phase deviation of the output of the first level of phase correction, and demodulate the PUSCH.

Implementations may include one or more of the following features. The method, apparatus, or system where measuring the phase deviation on the output of the first level of phase correction includes moving all Quadrature Amplitude Modulated (QAM) symbols to a first quadrant by applying a phase shift of $-\pi/4$, $-\pi/2$, and $-\pi/3$ radians to symbols in 2nd, 3rd, and 4th quadrants respectively. Computing a difference between an average phase of the QAM symbols and an expected average phase of $\pi/4$ radians or 45 degrees. The method, apparatus, or system further comprising performing the second level of phase correction twice in a case where the doppler shift received from layer 2 has a value of zero. The method, apparatus, or system where performing the first level of phase correction on the PUSCH includes receiving the doppler shift reported to Layer 2 by Layer 1. The method, apparatus, or system where the first DM-RS and the second DM-RS are four symbols apart, and where the phase correction applied to the first and second DM-RS symbols and the data symbols is a phase deviation measured on the PUCCH. Implementations of the described techniques may include hardware, a method or process, or a computer tangible medium.

DETAILED DESCRIPTION

Figure 1:
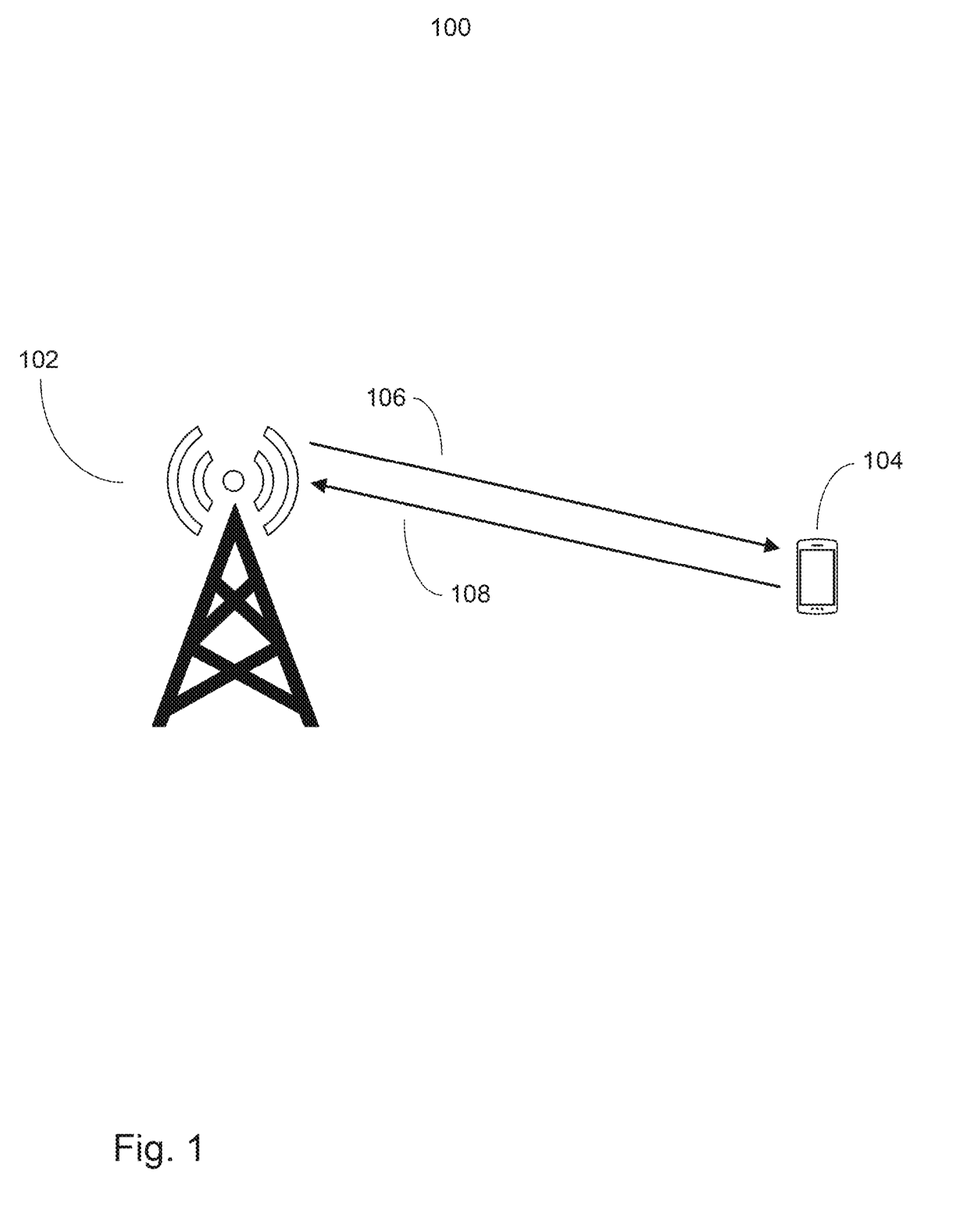
FIG. 1 illustrates a communication link between a mobile device and a network device according to an example embodiment.

FIG. 1 illustrates a communication link between a mobile device and a network device. Network device 102, which may be a base station (eNB), access point, or the like transmits signal 106 to mobile device 104, and receives a signal 108 transmitted by the mobile device 104. Signal 106 may be referred to as a downlink (DL) signal and signal 108 may be referred to as an uplink (UL) signal. Mobile device 104 receives signal 106 from network device 102 and transmits signal to 108 to network device 102.

There are significant differences between UL and DL signals in wireless communication systems such as LTE. These differences include the transmission and multiple access schemes which may result in different physical layer processing. For example, the UL may be based on Single Carrier Frequency Division Multiple Access (SC-FDMA) while the DL may be based on Orthogonal Frequency Division Multiple Access (OFDMA). SC-FDMA modulation may have a lower peak-to-average power ratio, which may result in lower cost amplifiers and less power usage. The user data is modulated onto a single carrier modulation format, and may be modulated using Quadrature Phase Shift Keying (QPSK), 16 Quadrature Amplitude Modulation (QAM), or a higher order modulation such as 64 QAM. In 16 QAM, the carrier may be modulated into any of 16 different phase and amplitude states, and in 64 QAM, the carrier may be modulated into any of 64 different phase and amplitude states.

Uplink signals may not have a dedicated synchronization signal. Uplink frames can be synchronized using PUCCH Demodulation Reference Signals (DM-RS). The following description will focus on the PUSCH and PUCCH. The PUSCH carries user data as well as control signal data. Control data information may be multiplexed with the user data before a Discrete Fourier Transform (DFT) spreading module in the uplink SC-FDMA physical layer.

Figure 2:
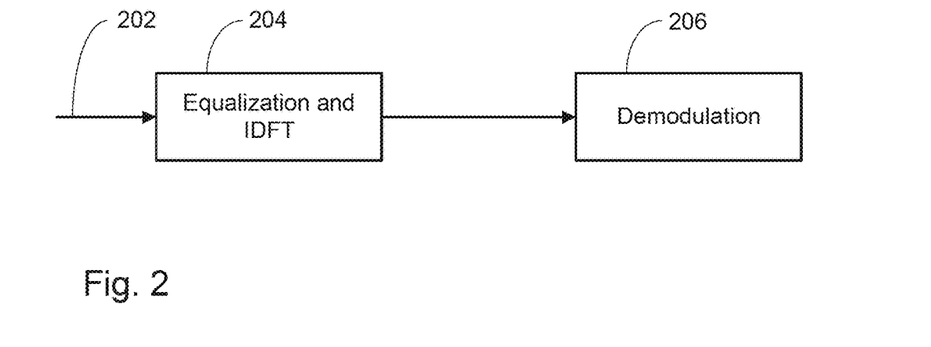
FIG. 2 illustrates a generalized PUSCH receive chain.

FIG. 2 illustrates a generalized PUSCH receive chain. A PUSCH signal is 202 received at 204. At 204 the signal is equalized and an Inverse Discrete Fourier Transform (IDFT) is performed. At 206 the PUSCH signal 202 is demodulated.

Figure 3:
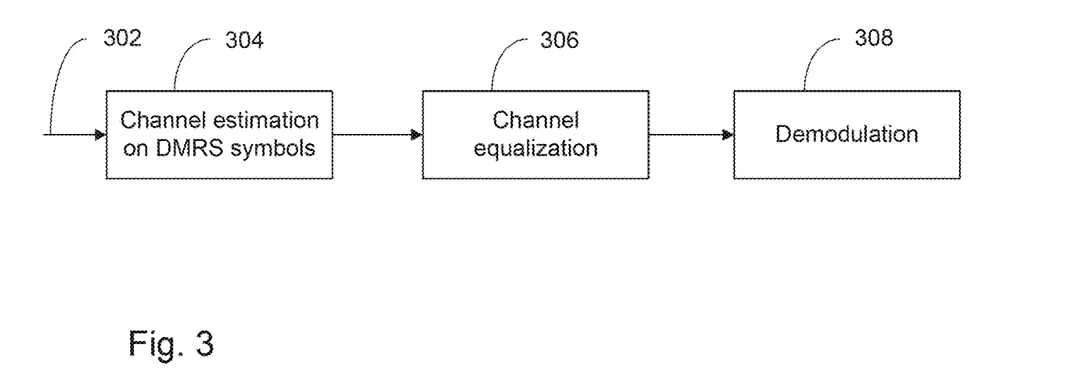
FIG. 3 illustrates a generalized PUCCH receive chain.

FIG. 3 illustrates a generalized PUCCH receive chain. A PUCCH signal 302 is received at 304. Channel estimation is performed on the DM-RS symbols of the PUCCH at 304. At 306 Channel equalization is performed, and at 308 the PUCCH is demodulated. The PUSCH receive chain illustrated in FIG. 2 and PUCCH receive chain illustrated in FIG. 3 are examples of receive chains that may not be able to decode the PUSCH and PUCCH transmitted by a transmitter traveling at a high rate of speed.

Figure 4:
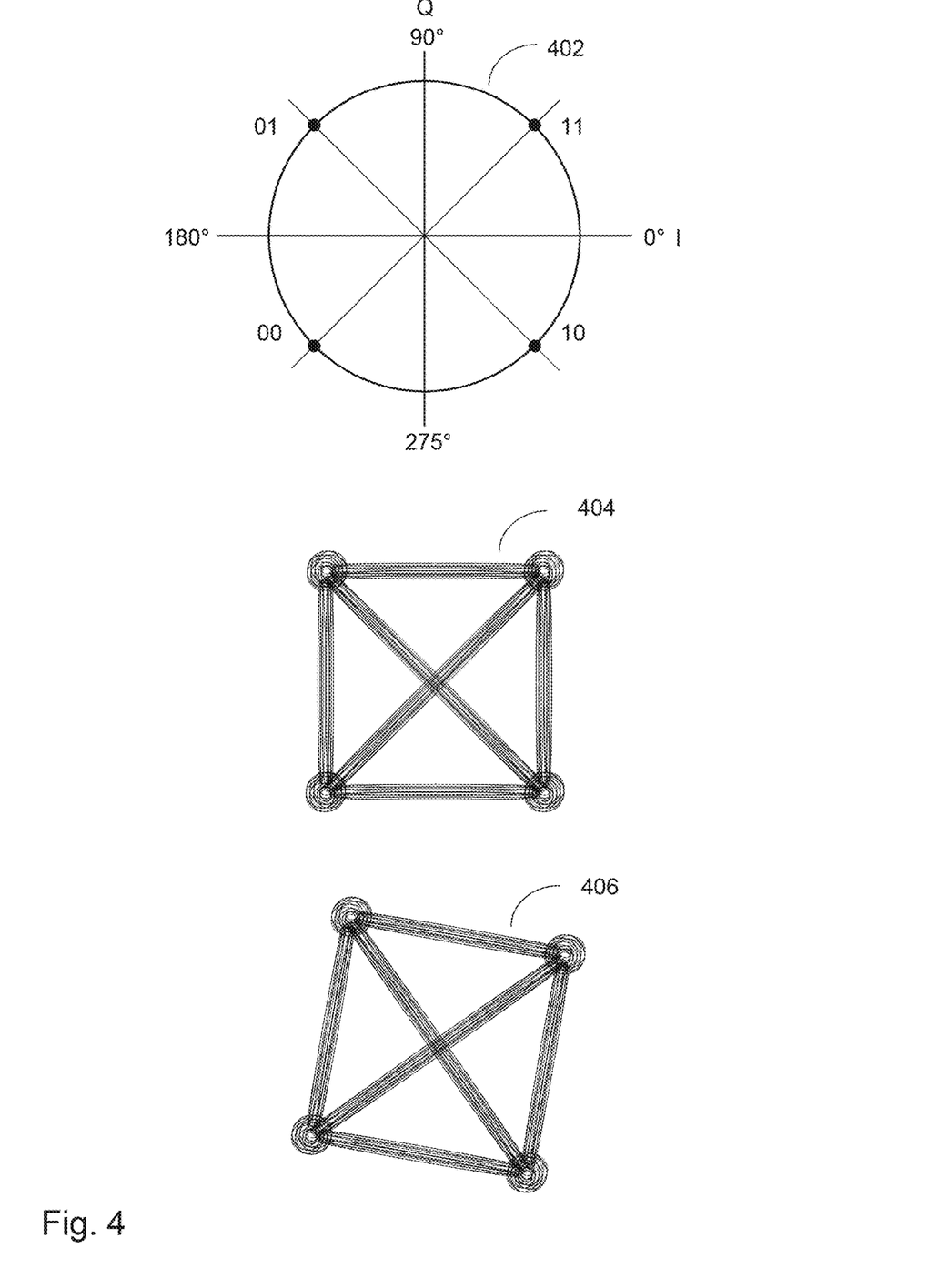
FIG. 4 shows a QPSK constellation diagram.

FIG. 4 shows a QPSK constellation diagram. With modulation techniques used for digital communication, the variations applied to the carrier are restricted according to the discrete information being transmitted. An original signal is separated into a set of independent components I and Q. The data is separated into two channels, I and Q. Two bits are transmitted simultaneously, one bit per channel. The two carriers are combined and transmitted. The I and Q components may be considered orthogonal or in quadrature because they are separated by 90°. Viewed as a polar display, the magnitude and phase are represented together as illustrated at 402. It is noted that the modulation of the PUCCH is commonly QPSK.

With QPSK modulation, the carrier may vary in terms of phase as opposed to varying in frequency. The QPSK signal shifts among discrete phase states that are separated by 90°. Thus, a QPSK symbol may be represented by four discrete values. As an example, discrete values 00, 01, 10, and 11 are shown in 402. In the QPSK modulation shown at 402, 11 may represent a 45° discrete value, 01 may represent a 135° discrete value, 00 may represent a 225° discrete value, and 10 may represent a 315° discrete value where each discrete value has an carrier amplitude of 1.0.

The QPSK constellation diagram at 404 illustrates equalized QPSK signals centered around their corresponding discrete value. This illustrates a QPSK constellation without any significant doppler shift.

A tilted QPSK constellation diagram is shown at 406. The tilted QPSK constellation diagram may result from a doppler shift where the tilt increases as the doppler shift increases. The doppler shift manifests as a phase ramp across the OFDM symbols. This may be viewed as a deviation of the angle of the complex symbols. The OFDM symbols right next to the DM-RS may not exhibit much tilt, but the symbols farther away from the DM-RS may have significant tilt that cannot be compensated. Thus, a signal transmitted from a device traveling at a high rate of speed may be difficult or impossible for a conventional network receiver to decode due to the high phase deviation caused by the doppler spread.

While FIG. 4 illustrates a QPSK constellation, it should be appreciated that the above described doppler shift may be similar in QAM signals, for example 16-QAM signals. With QAM modulation the discrete values correspond with the phase and amplitude states. A QAM constellation diagram may be identical to a QPSK constellation diagram with discrete values at 45, 135, 225, and 315 degrees.

Figure 5:
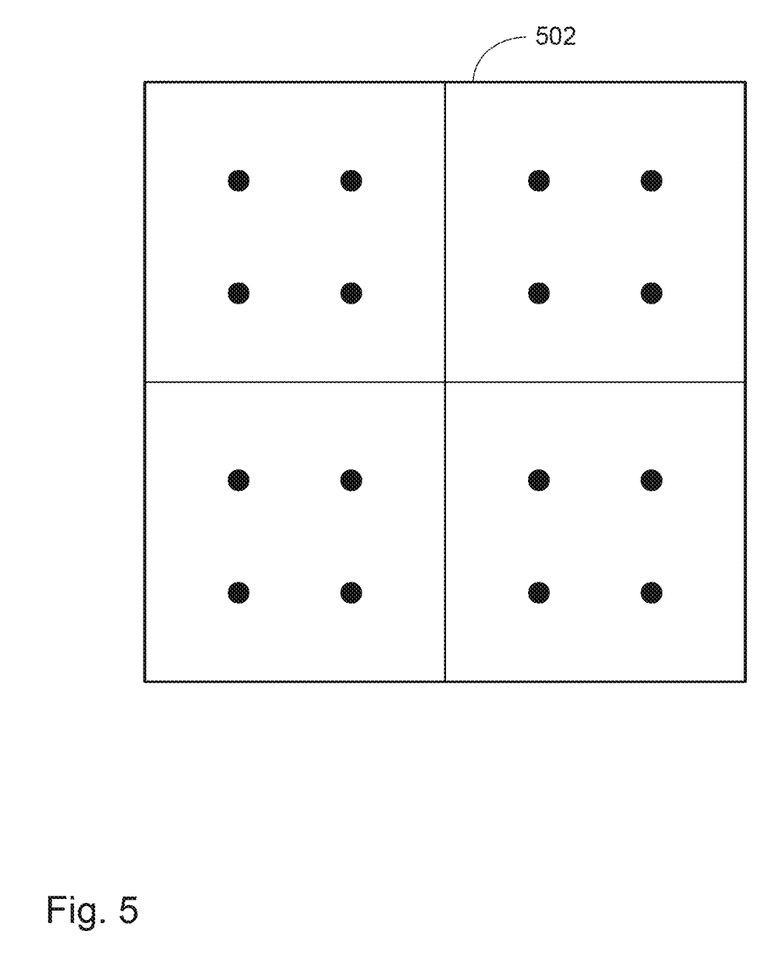
FIG. 5 shows a 16 QAM constellation diagram.

FIG. 5 shows a 16-QAM constellation diagram. In a 16-QAM modulated signal a continuous bit stream may be represented as a sequence and divided into four groups in each of the four quadrants. It can be seen that in the 16-QAM constellation diagram 502 each quadrant includes 4 groups. In 16-QAM six bits are used to represent a phase and amplitude state. That is, four I and four Q values are used yielding four bits per symbol ($2^4=16$). Thus, the amplitude and phase of the wireless signal may be regulated to one of 16 different discrete and measurable states as shown at 502.

It should be appreciated that a tilted QAM constellation may be similar to the tilted QPSK diagram shown at 406 resulting from a doppler shift where the tilt increases as the doppler shift increases.

It is noted that the PUCCH does not use the DFT SC-FDMA precoding used in the PUSCH data symbols. Also, as mentioned above, the modulation of the PUCCH is commonly QPSK.

Figure 6:
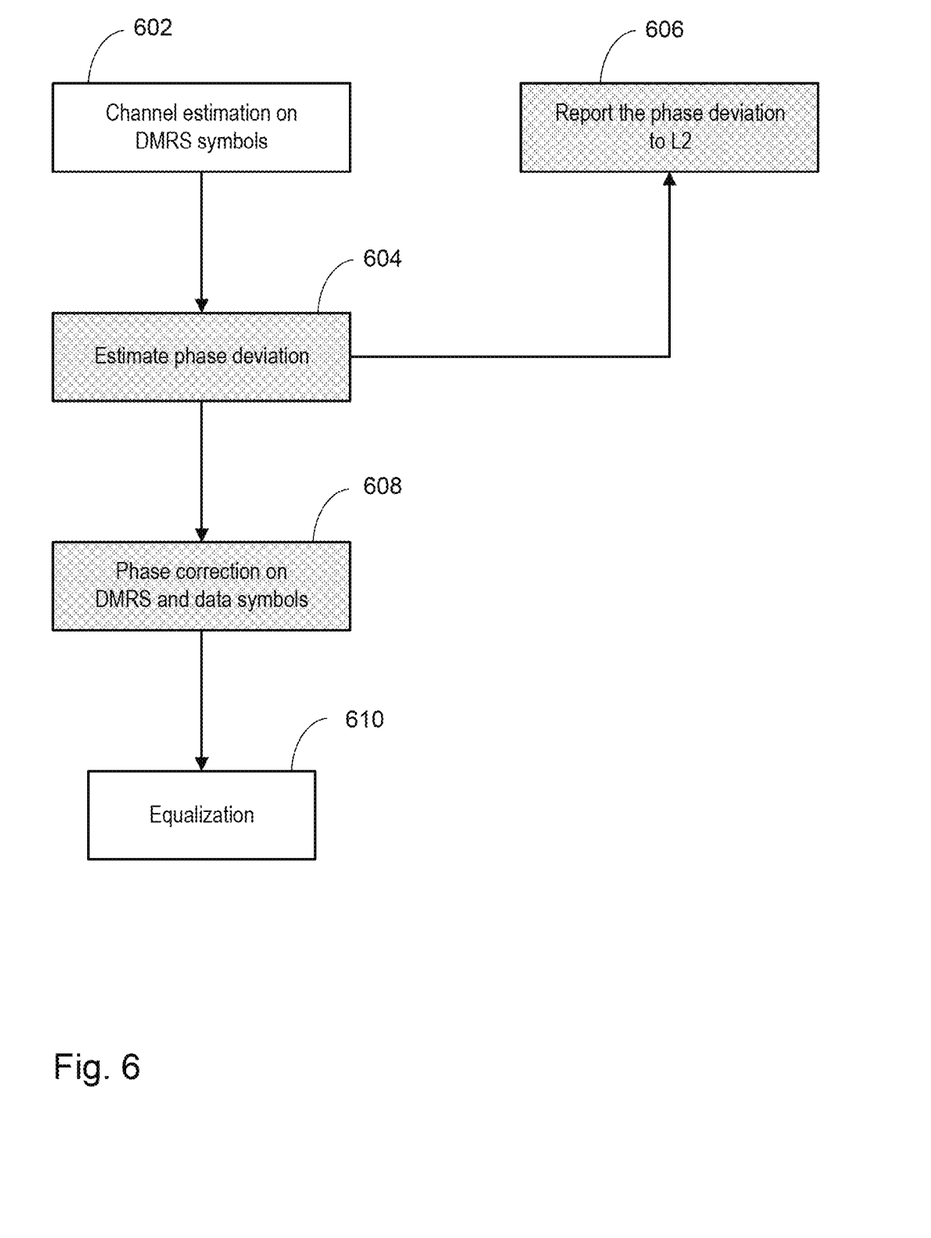
FIG. 6 illustrates a PUCCH receiver processing chain according to some embodiments.

FIG. 6 illustrates a PUCCH receiver processing chain according to some embodiments. The highlighted portions representing new processing that may be implemented to solve the problem of receiving PUCCH signals transmitted by a transmitter traveling at a high rate of speed.

The PUCCH channel estimation on the DM-RS is performed at 602. The DM-RS is a reference signal for the PUCCH. Format 1x and Format 2x of the PUCCH have multiple OFDM symbols carrying pilot signals.

PUCCH Format 1x has three DM-RS symbols typically located in the middle of a PUCCH slot. PUCCH Format 2x typically has two DM-RS symbols where the DM-RS symbols are typically located at the second and second to last symbols of a PUCCH slot. Thus, there is a difference between processing PUCCH Format 1x and PUCCH format 2x. The following is description is directed to PUCCH Format 2x.

For PUCCH Format 2x, a phase difference of the OFDM symbols of a first DM-RS and OFDM symbols of a second DM-RS is calculated. The OFDM symbols of the first DM-RS and the second DM-RS are correlated, and a doppler shift is determined. The doppler shift is proportional to the phase difference across the DM-RS symbols in the channel. The doppler shift is reported as phase deviation to L2 at 606.

At 608 a phase correction on the DM-RS and data symbols of the PUCCH is performed. Namely, at 608 the phase of the DM-RS and data symbols are compensated with the estimated phase deviation performed at 604. At 610 equalization of the PUCCH is performed on the output of 608.

The PUCCH channel estimation is performed using the DM-RS symbols at 602. For a PUCCH transmitted by a transmitter traveling at a high rate of speed, the phase deviation resulting for the high doppler shift is estimated at 604. The phase deviation is estimated at 604 is reported to L2 at 606.

Figure 7:
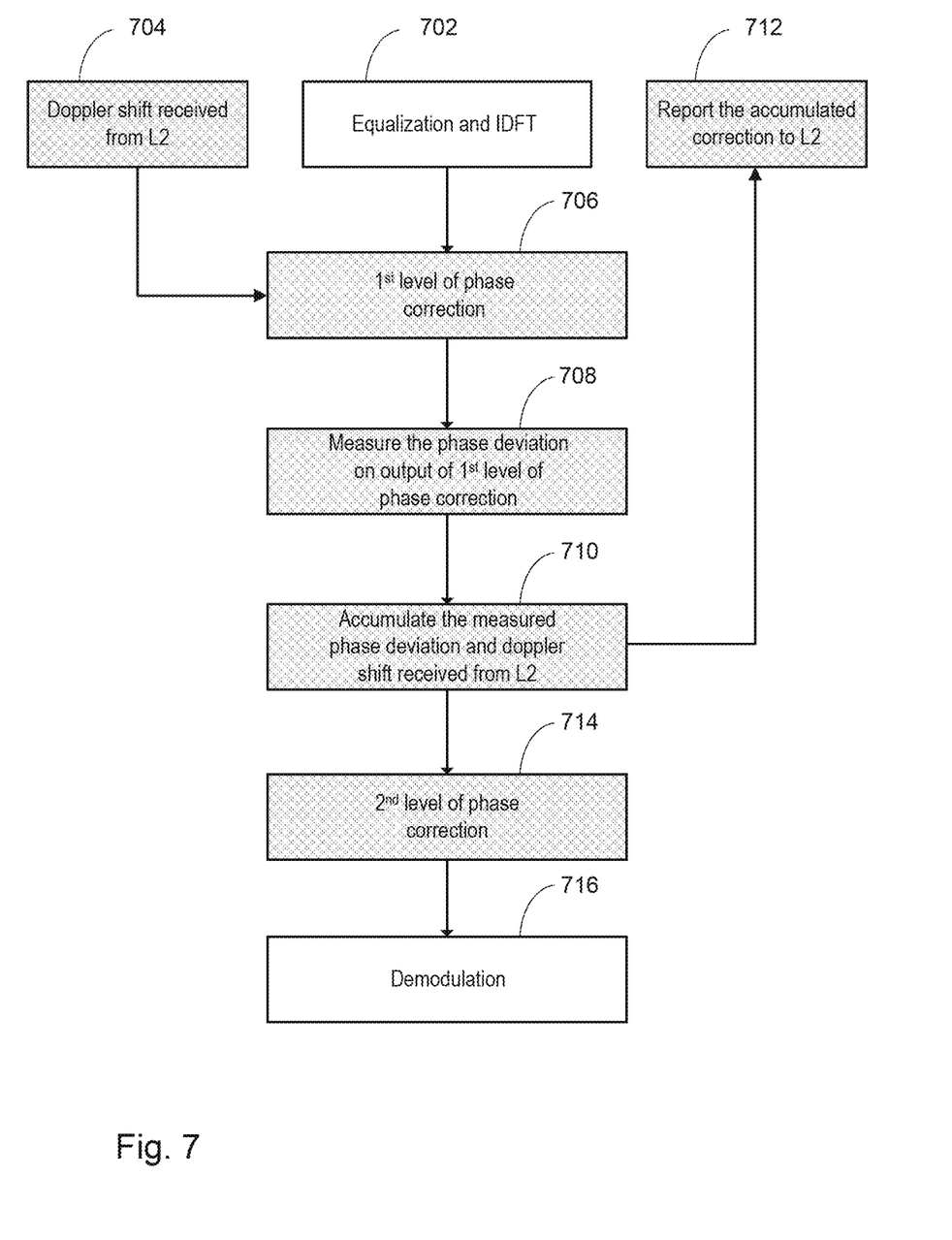
FIG. 7 illustrates a PUSCH receiver processing chain according to some embodiments.

FIG. 7 illustrates a PUSCH receiver processing chain according to some embodiments. The highlighted portions representing new processing that may be implemented to solve the problem of receiving PUSCH signals transmitted by a transmitter traveling at a high rate of speed.

The received PUSCH is equalized and an Inverse Discrete Fourier transform (IDFT) is performed at 702. At 704 doppler shift information is received from Layer 2. The doppler shift being proportional to a phase deviation. At 706 a first level of phase correction is performed. The first level of phase correction is performed on the output samples of the IDFT using the doppler shift information received from L2. That is, the phase of the IDFT output samples may be corrected according to the doppler shift information received from L2 at 704 where the doppler shift manifests as a phase spread across the OFDM symbols.

The phase deviation on the output of the first level of phase correction 706 is measured at 708. The phase deviation may be measured by moving all the QAM symbols to a first quadrant by applying a phase shift of $-\pi/4$, $-\pi/2$, and $-\pi/3$ radians to symbols in $2^{nd}$, $3^{rd}$, and $4^{th}$ quadrants respectively. Measuring the phase deviation may include computing a difference between an expected average phase of $\pi/4$ radians or 45 degrees.

Accumulating the measured phase deviation on the output of the first level of phase correction at 706 and the doppler shift received from Layer 2 at 704 is performed at 710 to derive an accumulated phase correction. The accumulated phase correction is reported to L2 at 712. This may be viewed as a type of feedback where the measured phase deviation at 708 is refined or improved. As a generalized example, take the doppler shift at 704 as corresponding to a value of 45°, or equivalent value in radians, and as a result of measuring the phase deviation at 708, it is determined that there is another 5° of phase correction. The 45° is accumulated with the 5° degrees at 710, and 50° is reported to L2. The processes at 706 to 710 may be repeated such that the phase deviation reported at 712 is refined with each iteration.

At 714 a second level of phase correction is performed on the output of 710. The phase is corrected at 714 based on the output of the first level of phase correction at 706 and the measured and accumulated phase correction at 708-710. At 716 the PUSCH is demodulated.

The doppler shift information received from L2 at 704 may correspond with the phase deviation estimated and reported from the PUCCH (see 604 and 608 of FIG. 6). There may be a case where the PUCCH has not yet been received, and there may be a case where the reported phase deviation of the PUCCH is old or stale and no longer valid. In such cases, the doppler shift information received from L2 at 704 may be reported as a zero (0) value.

In a case where the doppler shift received from L2 is zero, the processing at 714 may be performed twice.

It should be appreciated the PUCCH processes at 604, 606, and 608, the PUSCH processes at 704 and 706-714 provide a solution to the problem where a conventional network receiver cannot decode the PUCCH and/or PUSCH transmitted by a transmitter traveling at a high rate of speed. These processes determine the phase deviation caused by the high doppler spread of a high speed transmitter and compensate for the phase deviation before demodulating the PUCCH and/or PUSCH.

Figure 8:
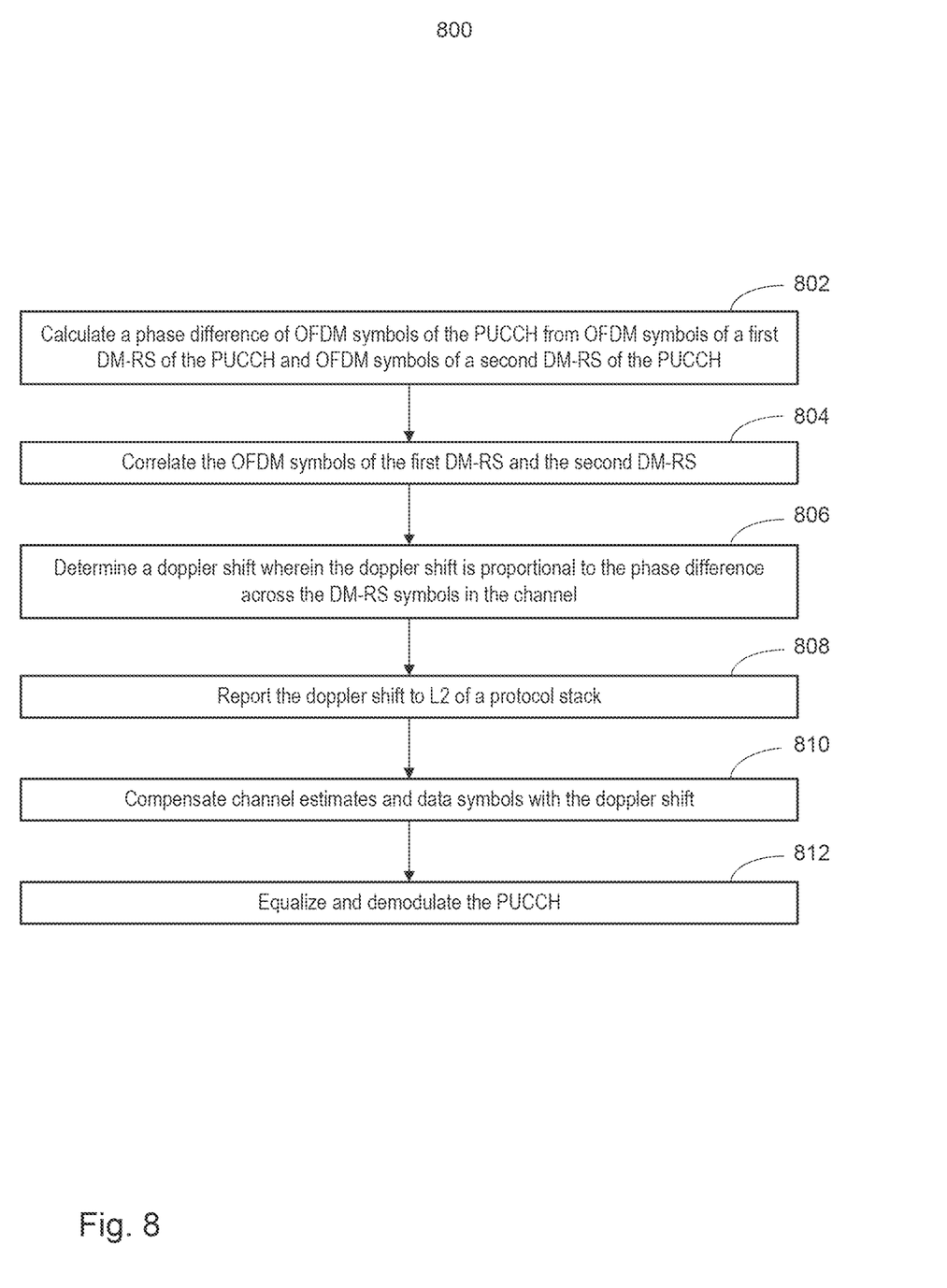
FIG. 8 is a flowchart of an example process for receiving a PUCCH transmitted form a high velocity mobile device.

FIG. 8 is a flowchart of an example process for receiving a PUCCH transmitted form a high velocity mobile device.

As shown in FIG. 8, process 800 may include calculating a phase difference of OFDM symbols of the PUCCH from OFDM symbols of a first DM-RS of the PUCCH and OFDM symbols of a second DM-RS of the PUCCH received by a network receiver at 802. For example, a receiver may calculate a phase difference of ODMA symbols of the PUCCH from OFDM symbols of a first DM-RS of the PUCCH and OFDM symbols of a second DM-RS of the PUCCH, as described above. The process 800 may include correlating the OFDM symbols of the first DM-RS and the second DM-RS at 804. For example, a receiver or device may correlate the OFDM symbols of the first DM-RS and the second DM-RS, as described above. Process 800 may include determining a doppler shift where the doppler shift is proportional to the phase difference across the DM-RS symbols in the channel at 806. For example, a receiver or device may determine a doppler shift where the doppler shift is proportional to the phase difference across the DM-RS symbols in the channel, as described above, The process 800 may include reporting the doppler shift to Layer 2 (L2) of a protocol stack at 808. For example, a receiver or device may report the doppler shift to L2 of a protocol stack, as described above. As further shown in FIG. 8, process 800 may include compensating channel estimates and data symbols with the doppler shift at 810. For example, a receiver or device may compensate channel estimates and data symbols with the doppler shift, as described above. As also shown in FIG. 8, process 800 may include equalizing and demodulating the PUCCH at 812. For example, a receiver or device may equalize and demodulate the PUCCH, as described above.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Process 800 may include additional implementations, such as any single implementation or any combination of implementations described below and/or in connection with one or more other processes described elsewhere herein.

Figure 9:
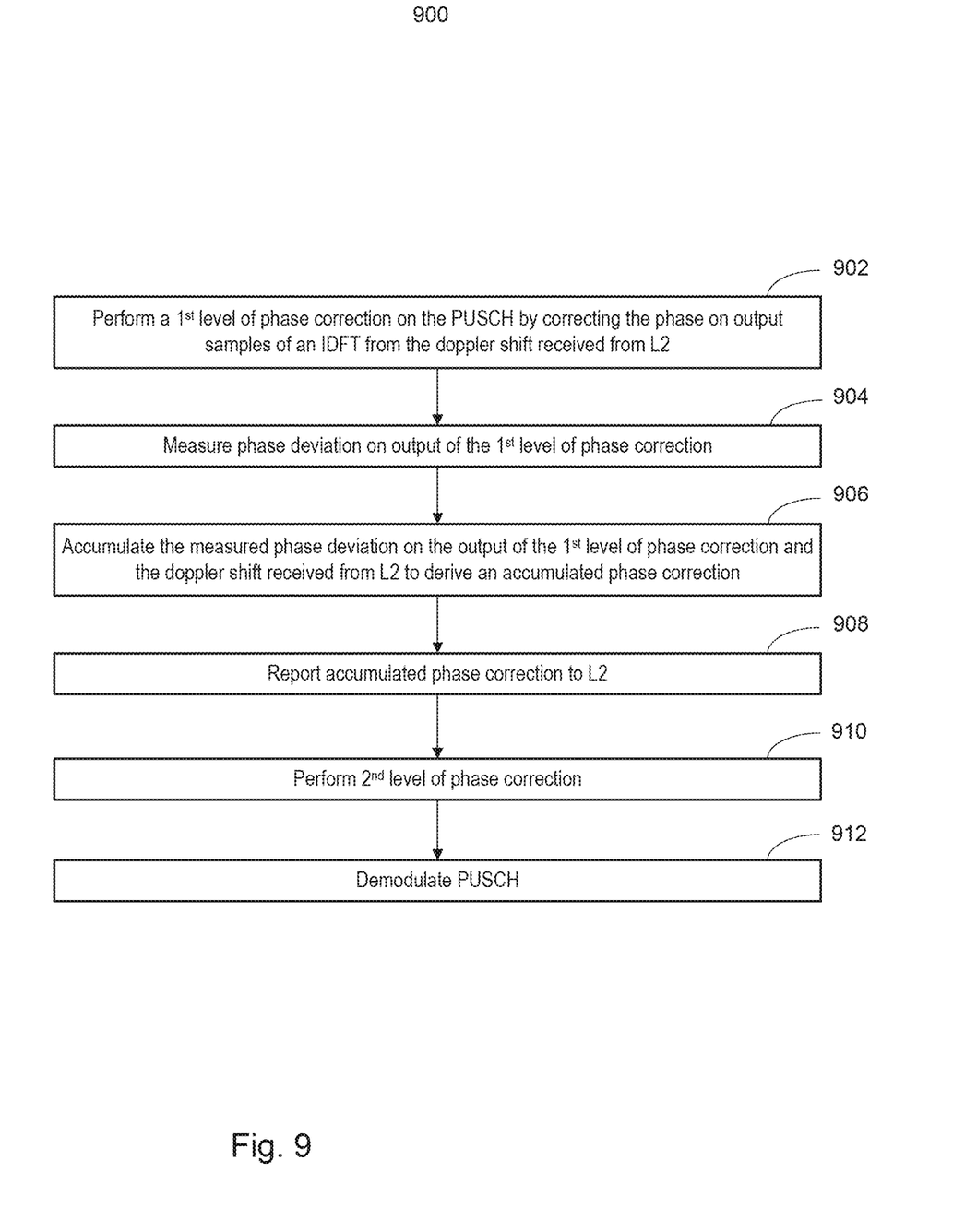
FIG. 9 is a flowchart of an example process for receiving a PUSCH transmitted form a high velocity mobile device.

FIG. 9 is a flowchart of an example process for receiving a PUSCH transmitted form a high velocity mobile device.

Process 900 may include performing a first level of phase correction on the PUSCH received by correcting the phase on output samples of an IDFT from a doppler shift received from L2 at 902. For example, a receiver of device may perform a first level of phase correction on the PUSCH received by the receiver by correcting the phase on output samples of an IDFT from the doppler shift received from L2, as described above. As also shown in FIG. 9, process 900 may include measuring a phase deviation on the output of the first level of phase correction at 904. For example, a receiver of device may measure a phase deviation on the output of the first level of phase correction, as described above. As further shown in FIG. 9, process 900 may include accumulating the measured phase deviation on the output of the first level of phase correction and the doppler shift received from L2 to derive an accumulated phase correction at 906. For example, a receiver or device may accumulate the first level of phase correction with the measured phase deviation to derive an accumulated phase correction, as described above. Process 900 may include reporting the accumulated phase correction to L2 at 908. For example, a receiver of device may report the accumulated phase correction to L2, as described above.

As also shown in FIG. 9, process 900 may include performing a second level of phase correction according to the measured phase deviation of the output of the first level of phase correction at 910. For example, a receiver or device may perform a second level of phase correction according to the measured phase deviation of the output of the first level of phase correction, as described above. Process 900 may include demodulating the PUSCH at 912. For example, a receiver or device may demodulate the PUSCH, as described above.

FIG. 9 shows example blocks of process 900, however, in some implementations, process 900 may include additional blocks, fewer blocks, different blocks, or differently arranged blocks than those depicted in FIG. 9. Additionally, or alternatively, two or more of the blocks of process 900 may be performed in parallel.

Process 900 may include additional implementations, such as any single implementation or any combination of implementations described below and/or in connection with one or more other processes described elsewhere herein.

In a first implementation, measuring the phase deviation on the output of the first level of phase correction includes moving all Quadrature Amplitude Modulated (QAM) symbols to a first quadrant by applying a phase shift of $-\pi/4$, $-\pi/2$, and $-\pi/3$ radians to symbols in 2nd, 3rd, and 4th quadrants respectively.

A second implementation, alone or in combination with the first implementation, process 800 may include computing a difference between an average phase of the QAM symbols and an expected average phase of $\pi/4$ radians or 45 degrees.

In a third implementation, alone or in combination with the first and second implementation, the measured phase deviation of the output of the first level of phase correction in the PUSCH is reported to Layer 2 as an input for the first level of phase correction in a case where the doppler shift of the PUCCH has a value of 0.

In a fourth implementation, alone or in combination with one or more of the first through third implementations, performing the first level of phase correction on the PUSCH includes receiving the doppler shift reported to Layer 2 by the PUCCH.

In a fifth implementation, alone or in combination with one or more of the first through fourth implementations, the first DM-RS and the second DM-RS are four symbols apart.

In a sixth implementation, alone or in combination with one or more of the first through fifth implementations, the phase correction applied to the first and second DM-RS symbols and the data symbols is a phase deviation measured on a on a Transmission Time Interval (TTI) on the first and second DM-RS symbols.

Other variations to the disclosed embodiments can be understood and effected by those skilled in the art in practicing the recited features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of decoding a Physical Uplink Shared Channel (PUSCH) and a Physical Uplink Control Channel (PUCCH) transmitted in a high-speed environment and received by a receiver, the method comprising:
    calculating a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received by the receiver;
    correlating the OFDM symbols of the first DM-RS and the second DM-RS;
    determining a doppler shift wherein the doppler shift is proportional to the phase difference across the DM-RS symbols in the channel;
    reporting the doppler shift to Layer 2 of a protocol stack;
    compensating channel estimates and data symbols with the doppler shift;
    equalizing and demodulating the PUCCH;
    performing a first level of phase correction on the PUSCH received by the receiver by correcting the phase on output samples of an Inverse Discrete Fourier transform (IDFT) from the doppler shift received from Layer 2;
    measuring a phase deviation on the output of the first level of phase correction;
    accumulating the measured phase deviation on the output of the first level of phase correction and the doppler shift received from Layer 2, to derive an accumulated phase correction;
    reporting the accumulated phase correction to Layer 2;
    performing a second level of phase correction according to the measured phase deviation of the output of the first level of phase correction; and
    demodulating the PUSCH.

2. The method according to claim 1, wherein measuring the phase deviation on the output of the first level of phase correction includes moving all Quadrature Amplitude Modulated (QAM) symbols to a first quadrant by applying a phase shift of $-\pi/4$, $-\pi/2$, and $-\pi/3$ radians to symbols in $2^{nd}$, $3^{rd}$, and $4^{th}$ quadrants respectively.

3. The method according to claim 2, further comprising computing a difference between an average phase of the QAM symbols and an expected average phase of $\pi/4$ radians or 45 degrees.

4. The method according to claim 1, wherein performing the first level of phase correction on the PUSCH includes receiving the doppler shift reported to Layer 2 by Layer 1.

5. The method according to claim 4, further comprising performing the second level of phase correction twice in a case where the doppler shift received from Layer 2 has a value of zero.

6. The method according to claim 1, wherein the first DM-RS and the second DM-RS are four symbols apart.

7. The method according to claim 1, wherein the phase correction applied to the first and second DM-RS symbols and the data symbols is a phase deviation measured on the PUCCH.

8. An apparatus for decoding a Physical Uplink Shared Channel (PUSCH) and a Physical Uplink Control Channel (PUCCH) transmitted in a high-speed environment and received by a receiver, the apparatus comprising:
    a memory configured to store a plurality of instructions;
    processor circuitry coupled to the memory and configured to execute the plurality of instructions to:
        calculate a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received by the receiver;
        correlate the OFDM symbols of the first DM-RS and the second DM-RS;
        determine a doppler shift wherein the doppler shift is proportional to the phase difference across the DM-RS symbols in the channel;
        report the doppler shift to Layer 2 of a protocol stack;
        compensate channel estimates and data symbols with the doppler shift;
        equalize and demodulate the PUCCH;
        perform a first level of phase correction on the PUSCH received by the receiver by correcting the phase on output samples of an Inverse Discrete Fourier transform (IDFT) from the doppler shift received from Layer 2;
        measure a phase deviation on the output of the first level of phase correction;
        accumulate the measured phase deviation on the output of the first level of phase correction and the doppler shift received from Layer 2, to derive an accumulated phase correction;
        report the accumulated phase correction to Layer 2;
        perform a second level of phase correction according to the measured phase deviation of the output of the first level of phase correction; and
        demodulate the PUSCH.

9. The apparatus according to claim 8, wherein measuring the phase deviation on the output of the first level of phase correction includes moving all Quadrature Amplitude Modulated (QAM) symbols to a first quadrant by applying a phase shift of $-\pi/4$, $-\pi/2$, and $-\pi/3$ radians to symbols in $2^{nd}$, $3^{rd}$, and $4^{th}$ quadrants respectively.

10. The apparatus according to claim 9, wherein the processor circuitry is further configured to execute the plurality of instructions to compute a difference between an average phase of the QAM symbols and an expected average phase of π/4 radians or 45 degrees.

11. The apparatus according to claim 8, wherein performing the first level of phase correction on the PUSCH includes receiving the doppler shift reported to Layer 2 by Layer 1.

12. The apparatus according to claim 11, wherein the second level of phase correction is performed twice in a case where the doppler shift received from layer 2 has a value of zero.

13. The apparatus according to claim 8, wherein the first DM-RS and the second DM-RS are four symbols apart.

14. The apparatus according to claim 8, wherein the phase correction applied to DM-RS symbols and the data symbols is a phase deviation measured between all the DM-RS symbols.

15. A communication system comprising:
   a mobile device configured to transmit a Physical Uplink Shared Channel (PUSCH) and a Physical Uplink Control Channel (PUCCH) in a high-speed environment; and
   an eNodeB configured to:
      calculate a phase difference of Orthogonal Frequency Division Multiplexing (OFDM) symbols of the PUCCH from OFDM symbols of a first Demodulation Reference Signal (DM-RS) of the PUCCH and OFDM symbols of a second DM-RS of the PUCCH received by from the mobile device;
      correlate the OFDM symbols of the first DM-RS and the second DM-RS;
      determine a doppler shift wherein the doppler shift is proportional to the phase difference across the DM-RS symbols in the channel;
      report the doppler shift to Layer 2 of a protocol stack;
      compensate channel estimates and data symbols with the doppler shift;
   equalize and demodulating the PUCCH;
      perform a first level of phase correction on the PUSCH received by the receiver by correcting the phase on output samples of an Inverse Discrete Fourier transform (IDFT) from the doppler shift received from Layer 2;
      measure a phase deviation on the output of the first level of phase correction;
      accumulate the measured phase deviation on the output of the first level of phase correction and the doppler shift received from Layer 2, to derive an accumulated phase correction;
      report the accumulated phase correction to Layer 2;
      perform a second level of phase correction according to the measured phase deviation of the output of the first level of phase correction; and
      demodulate the PUSCH.

16. The communication system according to claim 15, wherein measuring the phase deviation on the output of the first level of phase correction includes moving all Quadrature Amplitude Modulated (QAM) symbols to a first quadrant by applying a phase shift of −π/4, −π/2, and −π/3 radians to symbols in $2^{nd}$, $3^{rd}$, and $4^{th}$ quadrants respectively.

17. The communication system according to claim 16, wherein the eNodeB is further configured to compute a difference between an average phase of the QAM symbols and an expected average phase of π/4 radians or 45 degrees.

18. The communication system according to claim 15, wherein performing the first level of phase correction on the PUSCH includes receiving the doppler shift reported to Layer 2 by Layer 1.

19. The communication system according to claim 18, wherein the second level of phase correction is performed twice in a case where the doppler shift received from layer 2 is zero.

20. The communication system according to claim 15, wherein the first DM-RS and the second DM-RS are four symbols apart.

* * * * *